(12) United States Patent
Son et al.

(10) Patent No.: US 10,060,306 B2
(45) Date of Patent: *Aug. 28, 2018

(54) CONTINUOUS VARIABLE VALVE DURATION APPARATUS AND ENGINE PROVIDED WITH THE SAME

(71) Applicant: HYUNDAI MOTOR COMPANY, Seoul (KR)

(72) Inventors: You Sang Son, Suwon-si (KR); Woong Kim, Hwaseong-si (KR); Kyoung Pyo Ha, Seongnam-si (KR); Back Sik Kim, Osan-si (KR); Dongheon Park, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 77 days.

This patent is subject to a terminal disclaimer.

(21) Appl. No.: 15/272,502

(22) Filed: Sep. 22, 2016

(65) Prior Publication Data

US 2017/0167320 A1 Jun. 15, 2017

(30) Foreign Application Priority Data

Dec. 14, 2015 (KR) .......................... 10-2015-0178645

(51) Int. Cl.
*F01L 13/00* (2006.01)
*F01L 1/047* (2006.01)
(Continued)

(52) U.S. Cl.
CPC .......... *F01L 13/0015* (2013.01); *F01L 1/047* (2013.01); *F01M 9/10* (2013.01); *F01M 9/105* (2013.01);
(Continued)

(58) Field of Classification Search
CPC ................. F01L 13/0015; F01L 1/047; F01L 2013/0084; F01L 2013/111; F02D 13/0211; Y02T 10/18
See application file for complete search history.

(56) References Cited

U.S. PATENT DOCUMENTS 5,924,334 A 7/1999 Hara et al.
9,869,215 B2 * 1/2018 Son ...................... F01L 13/0015
(Continued)

FOREIGN PATENT DOCUMENTS

JP H06-185321 A 7/1994
JP H09-41924 A 2/1997
(Continued)

*Primary Examiner* — Mark Laurenzi
*Assistant Examiner* — Wesley Harris
(74) *Attorney, Agent, or Firm* — Brinks Gilson & Lione

(57) ABSTRACT

A continuous variable valve duration apparatus may include: a camshaft; first and second cam portions on which a cam is formed respectively; first and second inner brackets transmitting rotation of the camshaft to the first and second cam portions respectively; a slider housing in which the first and the second inner brackets are rotatably inserted; first and second guiding portions formed on the slider housing; a cam cap on which a cam cap guide contacting the second guiding portion is formed; a control shaft parallel to the camshaft; a control rod eccentrically formed on the control shaft; a guide head on which a head guiding portion and a head hole are formed; a control portion selectively rotating the control shaft; and a stopper limiting movement of the guide head. The head guiding portion is connected to the first guiding portion, and the control rod is inserted into the head hole.

21 Claims, 11 Drawing Sheets

(51) Int. Cl.
  *F01M 9/10*    (2006.01)
  *F02D 13/02*   (2006.01)
  *F01M 11/02*   (2006.01)

(52) U.S. Cl.
  CPC ... *F02D 13/0211* (2013.01); *F01L 2013/0084* (2013.01); *F01L 2013/111* (2013.01); *F01M 11/02* (2013.01); *Y02T 10/18* (2013.01)

(56)           References Cited

U.S. PATENT DOCUMENTS 9,874,119 B2 *   1/2018  Kim ................... F01L 13/0015
  2002/0007809 A1 *  1/2002  Miyazato ............ F01L 13/0015
                                                          123/90.16

FOREIGN PATENT DOCUMENTS

JP          5582195 B2    7/2014
  JP        2015-117692 A   6/2015

* cited by examiner she # CONTINUOUS VARIABLE VALVE DURATION APPARATUS AND ENGINE PROVIDED WITH THE SAME

CROSS-REFERENCE TO RELATED APPLICATION

This application claims priority to and the benefit of Korean Patent Application No. 10-2015-0178645, filed on Dec. 14, 2015, the entire contents of which are incorporated herein by reference.

FIELD

The present disclosure relates to a continuous variable valve duration apparatus and an engine provided with the same.

BACKGROUND

The statements in this section merely provide background information related to the present disclosure and may not constitute prior art.

An internal combustion engine generates power by burning fuel in a combustion chamber in an air media drawn into the chamber. Intake valves are operated by a camshaft in order to intake the air, and the air is drawn into the combustion chamber while the intake valves are open. In addition, exhaust valves are operated by the camshaft, and a combustion gas is exhausted from the combustion chamber while the exhaust valves are open.

Optimal operation of the intake valves and the exhaust valves depends on a rotation speed of the engine. That is, an optimal lift or optimal opening/closing timing of the valves depends on the rotation speed of the engine. In order to achieve such optimal valve operation depending on the rotation speed of the engine, various researches, such as designing of a plurality of cams and a continuous variable valve lift (CVVL) that can change valve lift according to engine speed, have been undertaken.

Also, in order to achieve such an optimal valve operation depending on the rotation speed of the engine, research has been undertaken on a continuously variable valve timing (CVVT) apparatus that enables different valve timing operations depending on the engine speed. The general CVVT may change valve timing with a fixed valve opening duration.

However, the general CVVL and CVVT are complicated in construction and are expensive in manufacturing cost.

The above information disclosed in this Background section is only for enhancement of understanding of the background of the present disclosure and therefore it may contain information that does not form the prior art that is already known to a person of ordinary skill in the art.

SUMMARY

Various aspects of the present disclosure provides a continuous variable valve duration apparatus and an engine provided with the same which may vary opening duration of a valve according to operation conditions of an engine, with a simple construction.

A continuous variable valve duration apparatus according to an exemplary form of the present disclosure may include: a camshaft; first and second cam portions on which a cam is formed respectively, the camshaft inserted into the first and second cam portions of which relative phase angles with respect to the camshaft are variable; first and second inner brackets transmitting rotation of the camshaft to the first and second cam portions respectively; a slider housing in which the first and the second inner brackets are rotatably inserted, in which a first guiding portion is formed on upper portion of the slider housing, and a second guiding portion vertical to the first guiding portion is formed on the slider housing; a cam cap on which a cam cap guide is formed and configured to contact the second guiding portion and guide movement of the slider housing; a control shaft parallel to the camshaft, and a control rod eccentrically formed on the control shaft; a guide head on which a head guiding portion and a head hole are formed, wherein the head guiding portion is slidably connected to the first guiding portion and the control rod is rotatably inserted into the head hole; a control portion selectively rotating the control shaft such that the slider housing is moved along the cam cap guide; and a stopper configured to limit movement of the guide head.

The stopper may be engaged with and fixed to the first guiding portion.

The control portion may include: a control motor rotating the control shaft, a position sensor detecting rotation of the control shaft and outputting corresponding signal, a memory storing current phase data of the control shaft, and a controller controlling operation of the control motor according to the output signal of the position sensor and an engine operation condition.

The controller may control the control motor for the guide head to contact the stopper, the controller may compare phase data of the control shaft when the guide head contacts the stopper with the current phase data of the control shaft stored in the memory, and the controller may adjust the current phase data of the control shaft stored in the memory.

The control portion may further include a worm wheel connected to the control shaft and a worm gear engaged with the worm wheel.

The first guiding portion and the head guiding portion may be slidably engaged with a rail shape.

The second guiding portion and the cam cap guide may be slidably engaged with a rail shape.

A shaft hole into which the control shaft is inserted may be formed in the cam cap, and a shaft bearing may be inserted into the shaft hole for supporting the control shaft.

The cam may be formed on the first and the second cam portions as a pair, and a cam connecting portion may be formed between the two cams (the paired cams) of each of the first and second cam portions. In addition, a cam support for rotatably supporting the cam connecting portion may be formed on the cam cap.

A cam key may be formed on the first and second cam portions respectively, and a first and a second sliding holes may be formed in the first and second inner brackets respectively. Furthermore, a cam key pin may be rotatably inserted into the each first sliding hole, a cam key slot may be formed in the cam key pin, and the cam key is slidably inserted into the cam key slot. In one form, a camshaft pin may be connected to the camshaft, and a slider pin may be rotatably inserted into the each second sliding hole, and in another form, a camshaft pin slot may be formed in the slider pin, and the camshaft pin may be slidably inserted into the camshaft pin slot.

A cam key may be is formed on the first and second cam portions respectively, and a first and a second sliding holes may be formed in the first and second inner brackets respectively. In one form, a cam key pin may be rotatably inserted into the each first sliding hole, and a cam key slot may be formed in the cam key pin so that the cam key is slidably inserted into the cam key slot. In another form, a slider pin may include a pin body and a pin head integrally formed with the pin body, and in particular, the pin body may be slidably inserted into camshaft and the pin head may be rotatably inserted into the second sliding hole.

In still another form, a camshaft oil hole may be formed in the camshaft along a length direction thereof, a body oil hole may be formed in the pin body and communicates with the camshaft oil hole, and an oil groove communicated with the body oil hole may be formed in the pin head.

An engine according to an exemplary form of the present disclosure may include: a camshaft; first and second cam portions on which a cam is formed respectively, the camshaft inserted into the first and second cam portions of which relative phase angles with respect to the camshaft are variable; first and second inner brackets transmitting rotation of the camshaft to the first and second cam portions respectively; a slider housing in which the first and the second inner brackets are rotatably inserted, wherein a first guiding portion is formed on an upper portion of the slider housing, and a second guiding portion vertical to the first guiding portion is formed on the slider housing; a cam cap on which a cam cap guide is formed and configured to contact the second guiding portion for guiding movement of the slider housing; a control shaft parallel to the camshaft, a control rod eccentrically formed on the control shaft; a guide head on which a head guiding portion and a head hole are formed, wherein the head guiding portion is slidably connected to the first guiding portion and the control rod is rotatably inserted into the head hole; a control portion selectively rotating the control shaft such that the slider housing is moved along the cam cap guide; and a stopper limiting movement of the guide head.

The stopper may be engaged with and fixed to the first guiding portion.

The control portion may include: a control motor rotating the control shaft, a position sensor detecting rotation of the control shaft and outputting corresponding signal, a memory storing current phase data of the control shaft, and a controller controlling operation of the control motor according to the output signal of the position sensor and an engine operation condition.

The controller may control the control motor for the guide head to contact the stopper, the controller may compare phase data of the control shaft when the guide head contacts the stopper with the current phase data of the control shaft stored in the memory, and the controller may adjust the current phase data of the control shaft stored in the memory.

The first guiding portion and the head guiding portion may be slidably engaged with a rail shape.

The second guiding portion and the cam cap guide may be slidably engaged with a rail shape.

The cam may be formed on the first and the second cam portions as a pair, a cam cap connecting portion may be formed between the two cams of each first and second cam portions, and a cam support for rotatably supporting the cam connecting portion may be formed on the cam cap.

A cam key may be formed on the first and second cam portions respectively, a first and a second sliding holes may be formed in the first and second inner brackets respectively, a cam key pin may be rotatably inserted into the each first sliding hole, wherein a cam key slot may be formed in the cam key pin, and the cam key is slidably inserted into the cam key slot. In addition, a camshaft pin may be connected to the camshaft, and a slider pin may be rotatably inserted into the each second sliding hole, wherein a camshaft pin slot is formed in the slider pin, and the camshaft pin is slidably inserted into the camshaft pin slot.

A cam key may be is formed on the first and second cam portions respectively, a first and a second sliding holes may be formed in the first and second inner brackets respectively, a cam key pin may be rotatably inserted into the each first sliding hole, wherein a cam key slot is formed in the cam key pin, and the cam key is slidably inserted into the cam key slot. In addition, a slider pin may include a pin body and a pin head integrally formed with the pin body, and wherein the pin body may be slidably inserted into camshaft and the pin head may be rotatably inserted into the second sliding hole.

A camshaft oil hole may be formed in the camshaft along a length direction thereof, a body oil hole communicated with the camshaft oil hole may be formed in the pin body, and an oil groove communicated with the body oil hole may be formed in the pin head.

As described above, the continuous variable valve duration apparatus according to an exemplary form of the present disclosure may vary an opening duration of a valve according to operation conditions of an engine, with a simple construction.

The exemplary continuous variable valve duration apparatus of the present disclosure may be reduced in size and thus the entire height of a valve train may be reduced.

Since the continuous variable valve duration apparatus may be applied to an existing engine without excessive modification, thus productivity may be enhance and production cost may be reduced.

By providing a stopper, malfunction of the exemplary continuous variable valve duration apparatus of the present disclosure may be inhibited or prevented and operational error may be adjusted.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
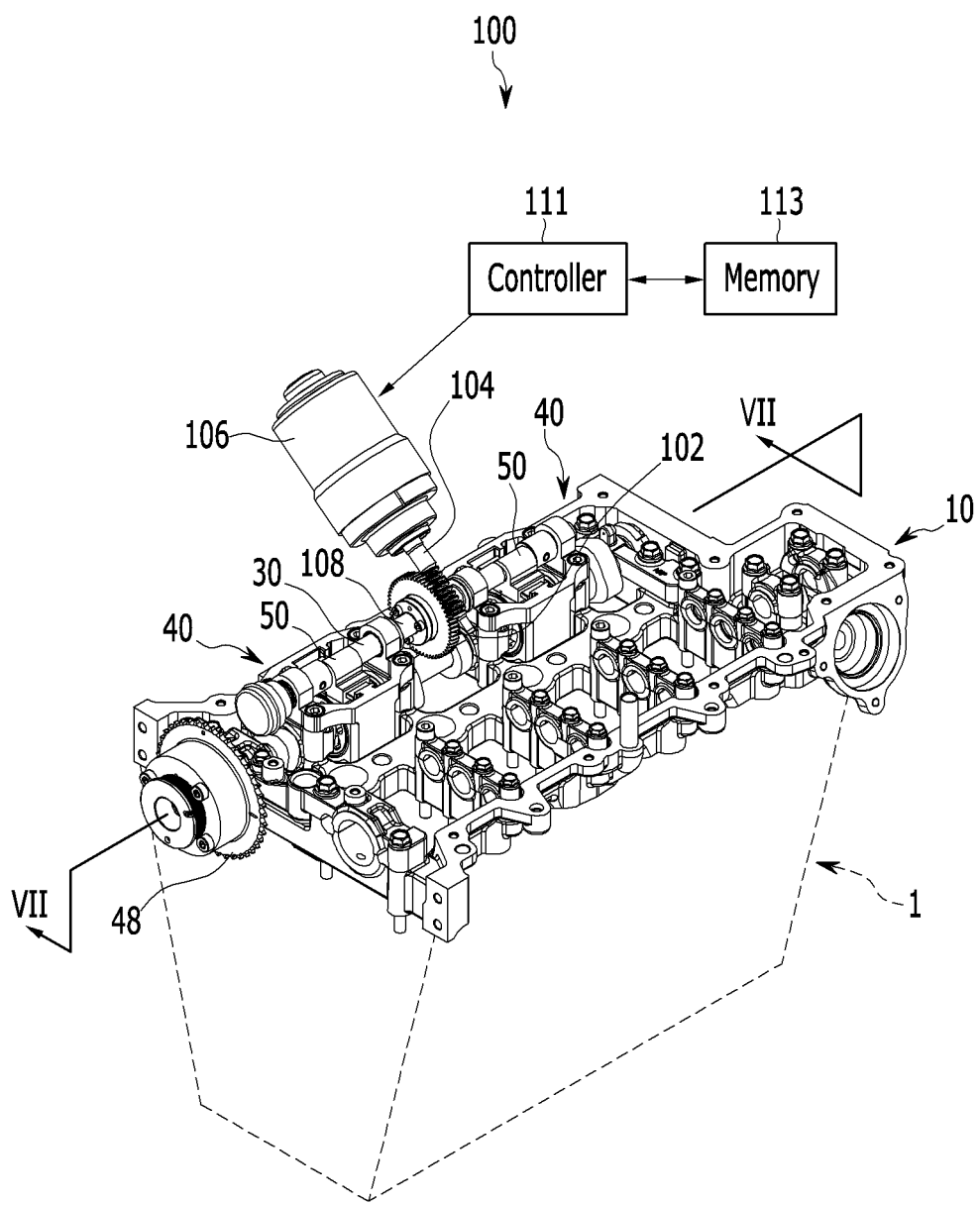
FIG. 1 is a perspective view of an engine provided with a continuous variable valve duration apparatus according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

A part irrelevant to the description will be omitted to clearly describe the present disclosure.

In the drawings, the thickness of layers, films, panels, regions, etc., are exaggerated for clarity.

Throughout the specification and the claims, unless explicitly described to the contrary, the word "comprise" and variations such as "comprises" or "comprising", will be understood to imply the inclusion of stated elements but not the exclusion of any other elements.

Figure 2:
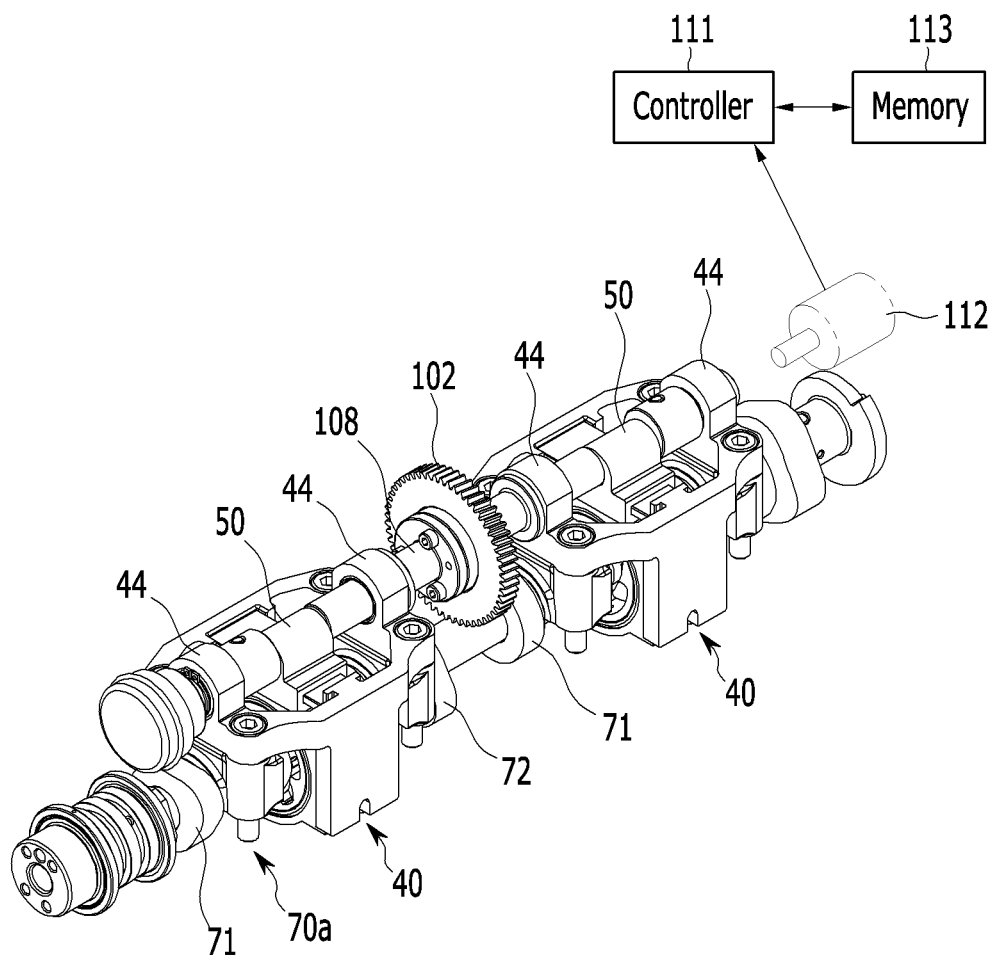
FIG. 2 is a perspective view of a continuous variable valve duration apparatus according to an exemplary form of the present disclosure.

FIG. 1 is a perspective view of an engine provided with a continuous variable valve duration apparatus, and FIG. 2 is a perspective view of a continuous variable valve duration apparatus.

Figure 3:
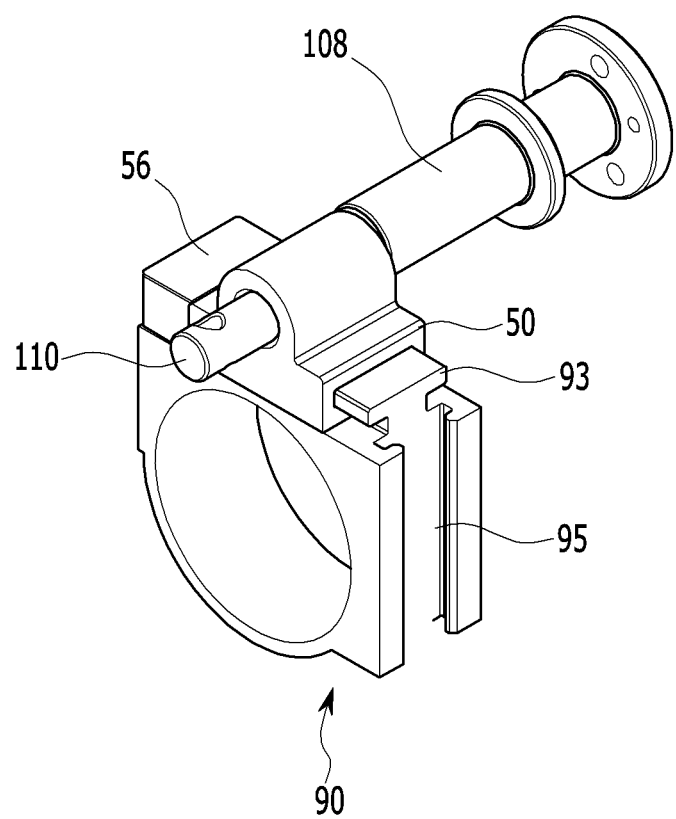
FIG. 3 is a perspective view showing a guide head and a slider housing of the continuous variable valve duration apparatus according to an exemplary form of the present disclosure.
Figure 4:
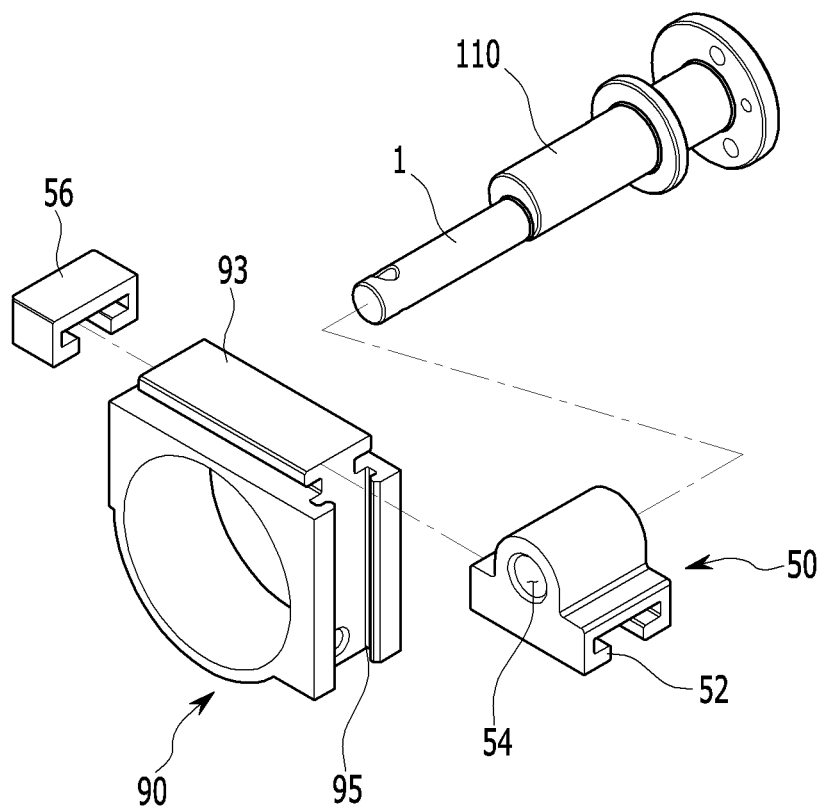
FIG. 4 is an exploded perspective view showing a guide head and a slider housing of the continuous variable valve duration apparatus according to an exemplary form of the present disclosure.

FIG. 3 is a perspective view showing a guide head and a slider housing of the continuous variable valve duration apparatus, and FIG. 4 is an exploded perspective view showing a guide head and a slider housing of the continuous variable valve duration apparatus.

Figure 5:
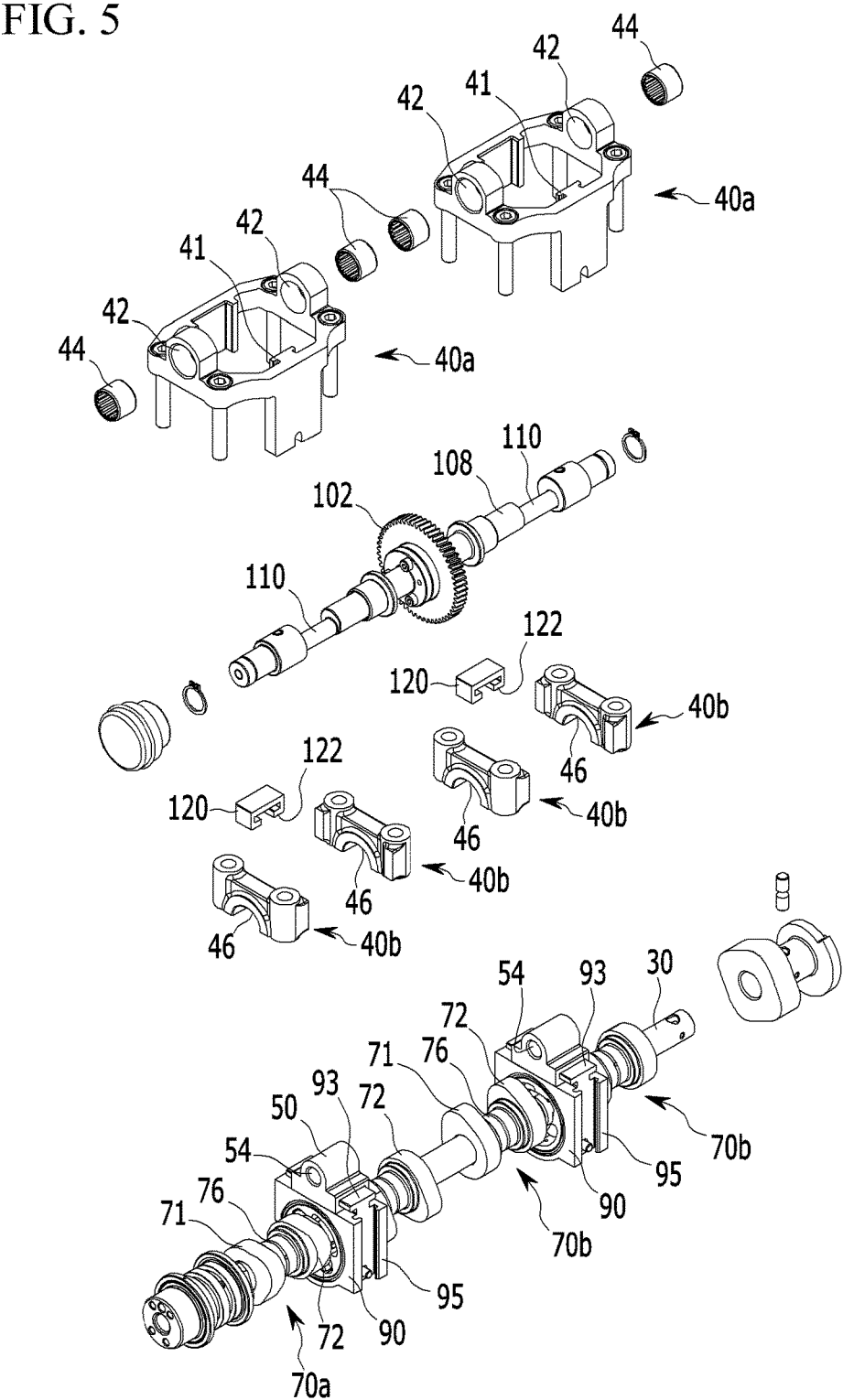
FIG. 5 and FIG. 6 are exploded perspective views of the exemplary continuous variable valve duration apparatus of the present disclosure.
Figure 6:
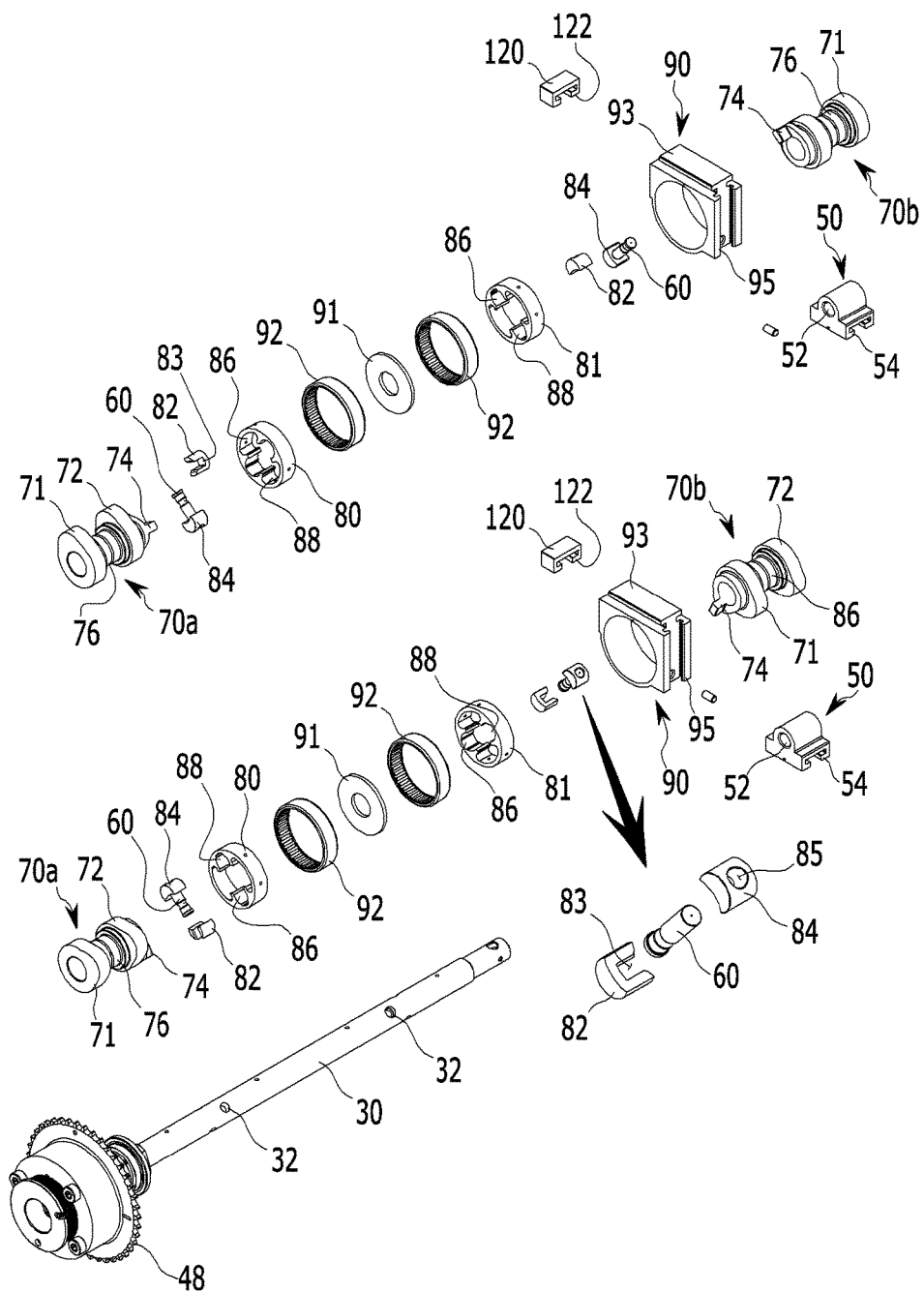
Figure 7:
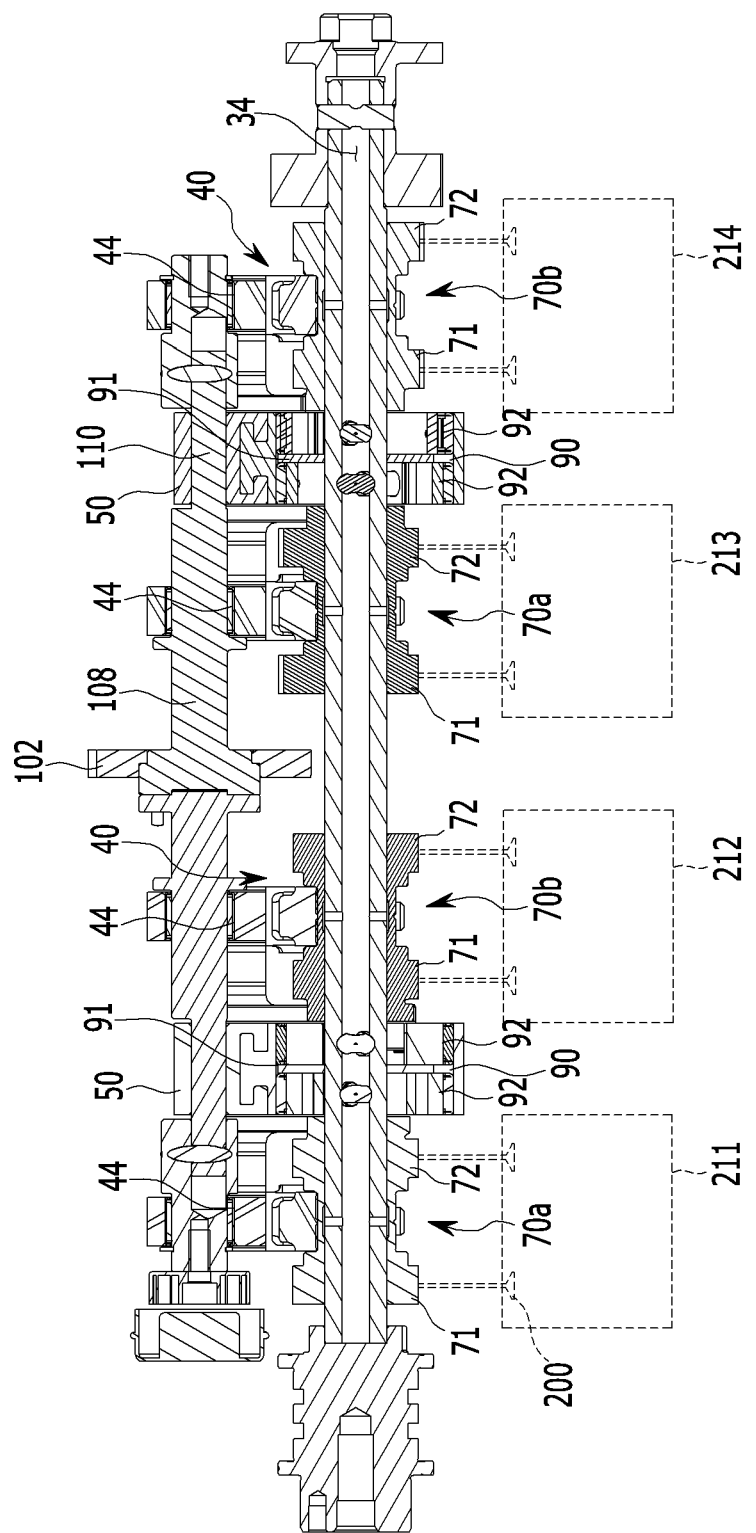
FIG. 7 is a cross-sectional view along line VII-VII of FIG. 1.
Figure 8:
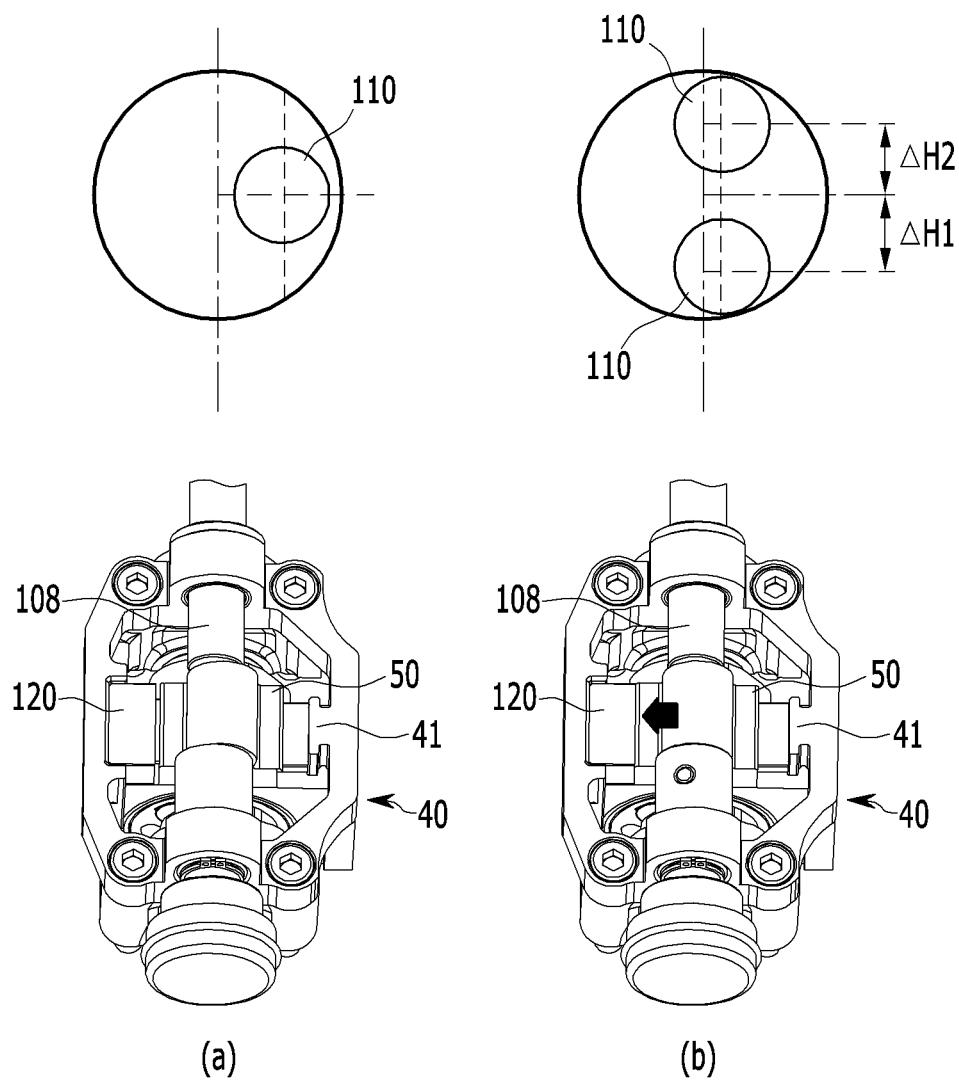
FIG. 8 is a drawing showing operations of an exemplary continuous variable valve duration apparatus of the present disclosure.

FIG. 5 and FIG. 6 are exploded perspective views of the exemplary continuous variable valve duration apparatus of the present disclosure. FIG. 7 is a cross-sectional view along line VII-VII of FIG. 1, and FIG. 8 is a drawing showing various operations of an exemplary continuous variable valve duration apparatus.

Referring to FIG. 1 to FIG. 8, an engine 1 includes a cylinder head 10, and a continuous variable valve duration apparatus mounted to the cylinder head 10. The cylinder head may include a cam carrier.

The camshaft 30 may be an intake camshaft or an exhaust camshaft and is rotated by a cam sprocket 48 connected with a crankshaft.

The continuous variable valve duration apparatus includes: a camshaft 30; a first and a second cam portions 70a and 70b on which a cam 71 and 72 are formed respectively; first and second inner brackets 80 and 81 transmitting rotation of the camshaft 30 to the first and second cam portions 70a and 70b respectively; a slider housing 90 into which the first and the second inner brackets 80 and 81 are rotatably inserted; a first and a second guiding portions 93, 95 formed on the slider housing 90; a cam cap 40 on which a cam cap guide 41 is formed; a control shaft 108 parallel to the camshaft 30; a control rod 110 eccentrically formed on the control shaft 108; a guide head 50 on which a head guiding portion 52 is formed; a control portion 100 selectively rotating the control shaft 108 for the slider housing 90 to be moved along the cam cap guide 41; and a stopper 120 disposed to limit movement of the guide head 50. In particular, the camshaft 30 is inserted into the first and second cam portions 70a and 70b of which relative phase angles with respect to the camshaft 30 are variable.

The first guiding portion 93 is formed on an upper portion of the slider housing 90, and the second guiding portion 95 is vertical to the first guiding portion 93. The cam cap guide 41 contacts the second guiding portion 95 and guides movement of the slider housing 90. Furthermore, the head guiding portion 52 is slidably connected to the first guiding portion 93, a head hole 54 is formed on the guide head 50, and the control rod 110 is rotatable insert into the head hole 54.

In the present disclosure, 4 cylinders 211, 212, 213 and 214 are formed to the engine, but it is not limited thereto.

The first guiding portion 93 and the head guiding portion 52 are slidably engaged with a rail shape. In FIGS. 3-4 and 6, although the first guiding portion 93 is formed as a "T" shape and the head guiding portion 52 is shaped as covering the first guiding portion 93, it is not limited thereto. On the contrary, the head guiding portion 52 may be shaped as a "T" shape and the first guiding portion 93 may be formed as covering the first guiding portion 93, or other engaged shapes such as rails may be possible.

The second guiding portion 95 and the cam cap guide 41 are slidably engaged with a rail shape. In FIGS. 5-6, although the cam cap guide 41 is formed as a "T" shape and the second guiding portion 95 is shaped as covering the first guiding portion 93, it is not limited thereto. On the contrary, the second guiding portion 95 may be shaped as a "T" shape and the cam cap guide 41 may be formed as covering the second guiding portion 95, or other engaged shapes such as rails may be possible.

The first guiding portion 93 and the head guiding portion 52 are slidable to each other, the second guiding portion 95 and the cam cap guide 41 are slidable to each other, and eccentric rotation of the control rod 110 is transferred to left and right direction movement of the guide head 50 and up and down direction movement of the slider housing 90. Thus, smooth and precise control of a position of the slider housing 90 may be possible.

The cam cap 40 may be formed integrally, or be assembled by a cam cap upper body 40a and a cam cap lower body 40b as shown in FIG. 5.

A shaft hole 42 in which the control shaft 108 is inserted is formed in the cam cap 40 and the shaft hole 42 may stably support the control shaft 108.

A shaft bearing 44 is inserted into the shaft hole 42 and rotatably supports the control shaft 108.

Two cams 71 and 72 may be formed to the first and the second cam portion 70a and 70b respectively, and a cam connecting portion 76 may be formed between the two cams 71 and 72. And a cam supporting portion 46 is formed to the cam cap 40 for rotatably supporting the cam connecting portion 76.

The cams 71 and 72 rotate and open the valve 200.

A cam key 74 is formed on the first and second cam portions 70a and 70b respectively, and a first sliding hole 86 and a second sliding hole 88 are formed to the first and second inner brackets 80 and 81 respectively.

A cam key pin 82 is rotatably inserted into the each first sliding hole 86, and a cam key slot 83 is formed on the cam key pin 82. The cam key 74 is slidably inserted into the cam key slot 83.

A camshaft hole 32 is formed in the camshaft 30 and a camshaft pin 60 is inserted into the camshaft hole 32 to be connected to the camshaft 30. And a slider pin 84 is rotatably inserted into the each second sliding hole 88, and a camshaft pin slot 85 is formed in the slider pin 84. The camshaft pin 60 is slidably inserted in the camshaft pin slot 85.

A slider housing bearing 92 may be disposed between slider housing 90 and the first and the second inner brackets 80 and 81 respectively, and thus relative rotations between the each slider housing 90 and the first and the second inner brackets 80 and 81 and rigidity may be obtained. The slider housing bearing 92 may be a needle bearing, a ball bearing, a roller bearing and so on, but it is not limited thereto.

A spacer 91 is disposed in the slider housing 90 and between the first and second inner brackets 80 and 81 to inhibit or prevent the rotations of the first and second inner brackets 80 and 81 from being interrupted.

As shown in FIG. 7, since the slider housing 90 is disposed between the first cam portion 70a and the second cam portion 70b, engine layout may be simplified and one slider housing 90 may control rotational speed of the first cam portion 70a and the second cam portion 70b simultaneously. Thus, the continuous variable valve duration apparatus may be constructed with simplified and elements number may be reduced.

Also, since elements for controlling the valve duration may be reduced, thus power loss of the engine may be reduced.

The control portion 100 includes a worm wheel 102 connected with the control shaft 108, a worm gear 104 engaged with the worm wheel 102, and a control motor 106 selectively rotating the worm gear 104. By applying the worm wheel 102 and the worm gear 104, thus motor capacity of the control motor 106 may be reduced.

The control portion 100 includes: a position sensor 112 detecting rotation of the control shaft 108 and outputting corresponding signal, a memory 113 storing current phase data of the control shaft 30, and a controller 111 controlling operation of the control motor 106 according to the output signal of the position sensor 112 and an engine operation condition.

The engine operation condition may include an acceleration position signal, a vehicle speed signal, an engine speed signal, an oil temperature signal, and so on.

The controller 111 may be implemented as one or more microprocessors operated by a predetermined program.

The controller 111 may control the control motor 106 for the guide head 50 to contact the stopper 120, compare phase data of the control shaft 108 when the guide head 50 contacts the stopper 120 with the current phase data of the control shaft 108 stored in the memory 113, and adjust the current phase data of the control shaft 108 stored in the memory 113.

By providing the stopper 120, malfunction of the exemplary continuous variable valve duration apparatus of the present disclosure may be inhibited and operational error may be adjusted.

Figure 9:
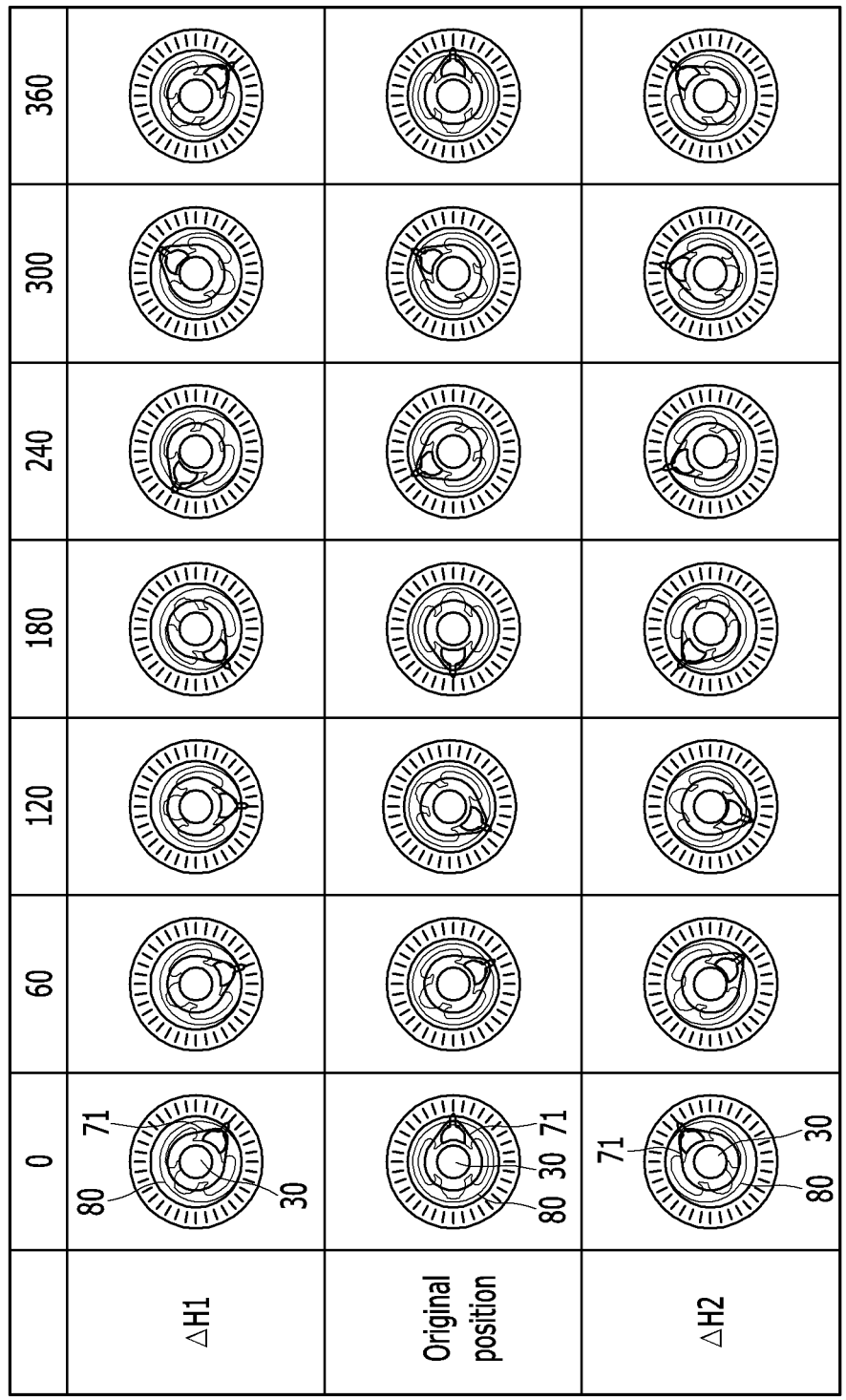
FIG. 9 is a table showing various operations of an exemplary continuous variable valve duration apparatus of the present disclosure.
Figure 10:
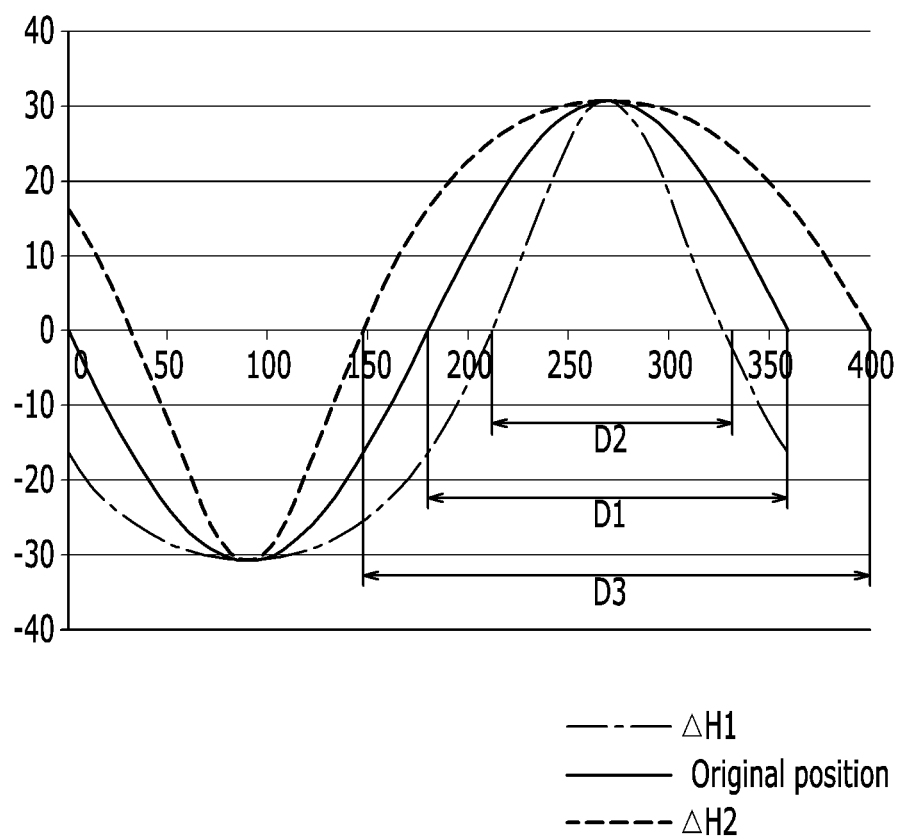
FIG. 10 is a graph showing various operations of an exemplary continuous variable valve duration apparatus of the present disclosure.

FIG. 9 is a table showing various operations of an exemplary continuous variable valve duration apparatus, and FIG. 10 is a graph showing various operations of an exemplary continuous variable valve duration apparatus.

Referring to FIG. 1 to FIG. 9, operations of the exemplary continuous variable valve duration apparatus will be described.

When rotation centers of the camshaft 30 and the first and second inner brackets 80 and 81 are coincident, that is, the slider housing 90 is positioned at an original position as shown in FIG. 9, the cams 71 and 72 rotate with the same phase angle of the camshaft 30. That is, the cams 71 and 72 and the camshaft 30 rotate with the same speed.

According to engine operation states, an ECU (engine control unit or electric control unit) transmits control signals to the control motor 106 of the control portion 100 to rotate the control shaft 108. Then, the control rod 110 eccentrically formed to the control shaft 108 rotates and the rotation of the control rod 110 is transferred to left and right direction movement of the guide head 50 and up and down direction movement of the slider housing 90.

According to the rotation of the control shaft 108, positions of the slider housing 90 and the first and the second inner brackets 80 and 81 with respect to a rotation center of the camshaft 30 are changed upward or downward.

When, the position of the slider housing 90 with respect to the camshaft 30 is changed, the relative rotation speed of the cams 71 and 72 with respect to the rotation speed of the camshaft 30 are changed.

While the camshaft pin 60 is rotated together with the camshaft 30, the camshaft pin 60 is slidable within the camshaft pin slot 85, the slider pin 84 is rotatably inserted into the second sliding hole 88, the cam key pin 82 is rotatably inserted into the first sliding hole 86, and the cam key 74 is slidable within the cam key slot 83. Thus the relative rotation speed of the cams 71 and 72 with respect to the rotation speed of the camshaft 30 is changed.

As shown in FIG. 8, while the phase angle of the camshaft 30 is constantly changed when the relative position of the slider housing 90 with respect to the rotation center of the camshaft 30 is changed downward as ΔH1, as shown in FIG. 9, the rotation speed of the cams 71 and 72 is relatively slower than rotation speed of the camshaft 30 near 60 to 120 degree, then then the rotation speed of the cams 71 and 72 is relatively faster than rotation speed of the camshaft 30 near 240 to 300 degree.

As shown in FIG. 8, while the phase angle of the camshaft 30 is constantly changed when the relative position of the slider housing 90 with respect to the rotation center of the camshaft 30 is changed upward as ΔH2, as shown in FIG. 9, the rotation speed of the cams 71 and 72 is relatively faster than rotation speed of the camshaft 30 near 60 to 120 degree, then then the rotation speed of the cams 71 and 72 is relatively slower than rotation speed of the camshaft 30 near 240 to 300 degree.

That is, as shown in FIG. 10, valve duration D2 in the case that the relative position of the slider housing 90 is changed to ΔH1 is shorter than valve duration D1 in the case that the position of the slider housing 90 is at the original position.

Also, valve duration D3 in the case that the relative position of the slider housing 90 is changed to ΔH2 is longer than valve duration D1 in the case that the position of the slider housing 90 is at the original position.

As shown in FIG. 8, the stopper 120 may limit movement of the control shaft 108 so that malfunction of the variable valve duration apparatus may be inhibited or prevented.

Also, by using a contacting position of the stopper 120 and the guide head 50, operational error of the variable valve duration apparatus may be adjusted.

In FIG. 10, for better comprehension and ease of description, peak points in FIG. 10 are constant, but it is not limited thereto.

According to adjusting contacting positions of the valve 200 and the cam 71 and 72, contacting angles of the valve 200 and the cam 71 and 72, a position of the cam key 74 and so on, valve duration may be enlarged by advancing opening timing and retarding closing timing of the valve 200. Or, valve duration may be shortened by retarding opening timing and advancing closing timing of the valve 200.

Also, opening timing of the valve 200 may be constant and closing timing of the valve 200 may be retarded or advanced as requested.

Also, closing timing of the valve 200 may be constant and opening timing of the valve 200 may be retarded or advanced as requested.

Figure 11:
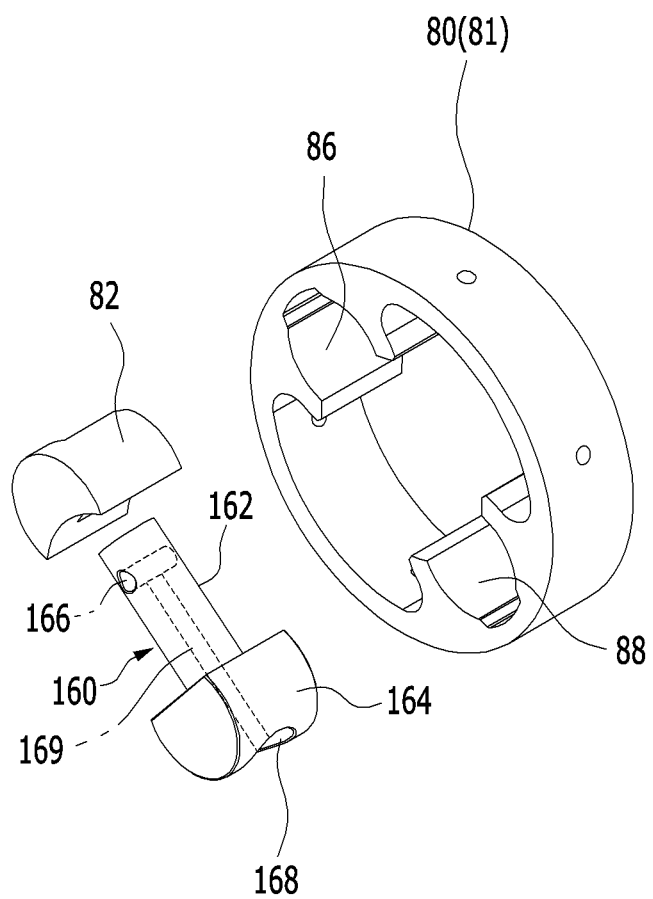
FIG. 11 is a drawing showing a slider pin of a continuous variable valve duration apparatus according to a modified form of the present disclosure.

FIG. 11 is a drawing showing a slider pin of a continuous variable valve duration apparatus according to a modified form of the present disclosure.

In the exemplary form, the camshaft pin 60 and the slider pin 84 may be disconnected, and a slider pin 84 (160 as shown in FIG. 11) may include a pin body 162 slidably inserted into the camshaft hole 32 of camshaft 30, and a pin head 164 which is integrally formed with the pin body 162 and rotatably inserted into the second sliding hole 88.

A camshaft oil hole 34 (referring to FIG. 7) is formed in the camshaft 30 along a length direction thereof, and a body oil hole 166 communicated with the camshaft oil hole 34 is formed in the pin body 162.

And an oil groove 168 communicated with the body oil hole 166 through a communicating hole 169 is formed in the pin head 164.

Since lubricant may be supplied from the camshaft oil hole 34 to the oil groove 168 through the body oil hole 166 and the communicating hole 169, thus friction between the pin head 164 and the second sliding hole 88 may be reduced.

Except the slider pin, operations and structures of the continuous variable valve duration apparatus according to a modified form of the present disclosure are the same of the exemplary form described above, repeated description will be omitted.

As described above, the exemplary continuous variable valve duration apparatus of the present disclosure may perform various valve durations according to operation conditions of an engine.

The exemplary continuous variable valve duration apparatus of the present disclosure may be reduced in size and thus the entire height of a valve train may be reduced.

Particularly, since the motor and so on of the control portion may be mounted outside of the cam carrier, the entire height of an engine may be reduced.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

| | |
|---|---|
| 1: engine | 10: cylinder head |
| 30: camshaft | 32: camshaft hole |
| 40: cam cap | 41: cam cap guide |
| 42: shaft hole | 44: shaft bearing |
| 46: cam supporting portion | 48: cam sprocket |
| 50: guide head | 52: head guiding portion |
| 54: head hole | 60: camshaft pin |
| 70a, 70b: first, second cam portion | 71, 72: cam |
| 74: cam key | 76: cam connecting portion |
| 80: first inner bracket | 81: second inner bracket |
| 82: cam key pin | 83: cam key slot |
| 84: slider pin | 85: camshaft pin slot |
| 86: first sliding hole | 88: second sliding hole |
| 90: slider housing | 91: spacer |
| 92: slider housing bearing | 93: first guiding portion |
| 95: second guiding portion | 100: control portion |
| 101: controller | 102: worm wheel |
| 104: worm gear | 106: control motor |
| 108: control shaft | 110: control rod |
| 112: position sensor | 113: memory |
| 120: stopper | 160: slider pin |
| 162: pin body | 164: pin head |
| 166: body oil hole | 168: oil goove |
| 169: communicate hole | 200: valve |
| 211-214: 1-4 cylinders | |

What is claimed is:

1. A continuous variable valve duration apparatus comprising:
   a camshaft;
   first and second cam portions on which a cam is formed respectively, the camshaft inserted into the first and second cam portions such that relative phase angles with respect to the camshaft are variable;
   first and second inner brackets configured to transmit rotation of the camshaft to the first and second cam portions respectively;
   a slider housing in which the first and the second inner brackets are rotatably inserted, wherein a first guiding portion is formed on an upper portion of the slider housing, and a second guiding portion vertical to the first guiding portion is formed on the slider housing;
   a cam cap on which a cam cap guide is formed and configured to contact the second guiding portion and guide a movement of the slider housing;
   a control shaft parallel to the camshaft, and a control rod eccentrically formed on the control shaft;
   a guide head on which a head guiding portion and a head hole are formed, wherein the head guiding portion is slidably connected to the first guiding portion and the control rod is rotatably inserted into the head hole;
   a control portion configured to selectively rotate the control shaft such that the slider housing is moved along the cam cap guide; and
   a stopper configured to limit a movement of the guide head.

2. The continuous variable valve duration apparatus of claim 1, wherein the stopper is engaged with and fixed to the first guiding portion.

3. The continuous variable valve duration apparatus of claim 1, wherein the control portion comprises:
   a control motor configured to rotate the control shaft;
   a position sensor configured to detect a rotation of the control shaft and output a corresponding signal;
   a memory configured to store current phase data of the control shaft; and
   a controller configured to control operation of the control motor according to the output signal of the position sensor and an engine operation condition.

4. The continuous variable valve duration apparatus of claim 3, wherein
   the controller controls the control motor for the guide head to contact the stopper,
   wherein the controller compares phase data of the control shaft, when the guide head contacts the stopper, with the current phase data of the control shaft stored in the memory, and wherein the controller adjust the current phase data of the control shaft stored in the memory.

5. The continuous variable valve duration apparatus of claim 3, wherein the control portion further comprises:
a worm wheel connected to the control shaft; and
a worm gear engaged with the worm wheel.

6. The continuous variable valve duration apparatus of claim 1, wherein the first guiding portion and the head guiding portion are slidably engaged with a rail shape.

7. The continuous variable valve duration apparatus of claim 1, wherein the second guiding portion and the cam cap guide are slidably engaged with a rail shape.

8. The continuous variable valve duration apparatus of claim 1, wherein
a shaft hole into which the control shaft is inserted is formed in the cam cap; and
a shaft bearing is inserted into the shaft hole and configured to support the control shaft.

9. The continuous variable valve duration apparatus of claim 1, wherein
the cam is formed on the first and the second cam portions as a pair, and wherein
a cam connecting portion is formed between the paired cams of each of the first and second cam portions, and
a cam support is formed on the cam cap and configured to rotatably support the cam connecting portion.

10. The continuous variable valve duration apparatus of claim 1, further comprising:
a cam key formed on the first and second cam portions, respectively;
first and second sliding holes formed in the first and second inner brackets, respectively;
a cam key pin rotatably inserted into the each first sliding hole, wherein a cam key slot is formed in the cam key pin, and the cam key is slidably inserted into the cam key slot;
a camshaft pin connected to the camshaft; and
a slider pin rotatably inserted into the each second sliding hole, wherein a camshaft pin slot is formed in the slider pin, and the camshaft pin is slidably inserted into the camshaft pin slot.

11. The continuous variable valve duration apparatus of claim 1, further comprising:
a cam key formed on the first and second cam portions, respectively;
first and second sliding holes formed in the first and second inner brackets, respectively;
a cam key pin rotatably inserted into the each first sliding hole, wherein a cam key slot is formed in the cam key pin, and the cam key is slidably inserted into the cam key slot; and
a slider pin including a pin body and a pin head integrally formed with the pin body, and
wherein the pin body is slidably inserted into the camshaft and the pin head is rotatably inserted into the second sliding hole.

12. The continuous variable valve duration apparatus of claim 11, further comprising:
a camshaft oil hole formed in the camshaft along a length direction thereof;
a body oil hole formed in the pin body and configured to communicate with the camshaft oil hole; and
an oil groove formed in the pin head and configured to communicate with the body oil hole.

13. The engine of claim 11, wherein the control portion comprises:
a control motor configured to rotate the control shaft;
a position sensor configured to detect a rotation of the control shaft and output a corresponding signal;
a memory configured to store current phase data of the control shaft; and
a controller configured to control operation of the control motor according to the output signal of the position sensor and an engine operation condition.

14. The engine of claim 13, wherein
the controller controls the control motor for the guide head to contact the stopper,
wherein the controller compares phase data of the control shaft, when the guide head contacts the stopper, with the current phase data of the control shaft stored in the memory, and
wherein the controller adjust the current phase data of the control shaft stored in the memory.

15. An engine comprising:
a camshaft;
first and second cam portions on which a cam is formed respectively, the camshaft inserted into the first and second cam portions of which relative phase angles with respect to the camshaft are variable;
first and second inner brackets configured to transmit rotation of the camshaft to the first and second cam portions respectively;
a slider housing in which the first and the second inner brackets are rotatably inserted, wherein a first guiding portion is formed on an upper portion of the slider housing, and a second guiding portion vertical to the first guiding portion is formed on the slider housing;
a cam cap on which a cam cap guide is formed and configured to contact the second guiding portion and guiding movement of the slider housing;
a control shaft parallel to the camshaft, a control rod eccentrically formed on the control shaft;
a guide head on which a head guiding portion and a head hole are formed, wherein the head guiding portion is slidably connected to the first guiding portion and the control rod is rotatably inserted into the head hole;
a control portion configured to selectively rotate the control shaft such that the slider housing is moved along the cam cap guide; and
a stopper configured to limit a movement of the guide head.

16. The engine of claim 15, wherein the stopper is engaged with and fixed to the first guiding portion.

17. The engine of claim 15, wherein the first guiding portion and the head guiding portion are slidably engaged with a rail shape.

18. The engine of claim 15, wherein the second guiding portion and the cam cap guide are slidably engaged with a rail shape.

19. The engine of claim 15, further comprising:
a cam key formed on the first and second cam portions, respectively;
first and second sliding holes formed in the first and second inner brackets, respectively;
a cam key pin rotatably inserted into the each first sliding hole, wherein a cam key slot is formed in the cam key pin, and the cam key is slidably inserted into the cam key slot;
a camshaft pin connected to the camshaft; and a slider pin rotatably inserted into the each second sliding hole, wherein a camshaft pin slot is formed in the slider pin, and the camshaft pin is slidably inserted into the camshaft pin slot.

20. The engine of claim 15, further comprising:

a cam key formed on the first and second cam portions, respectively;

first and second sliding holes formed in the first and second inner brackets, respectively;

a cam key pin rotatably inserted into the each first sliding hole, wherein a cam key slot is formed in the cam key pin, and the cam key is slidably inserted into the cam key slot; and a slider pin including a pin body and a pin head integrally formed with the pin body, and wherein the pin body is slidably inserted into the camshaft and the pin head is rotatably inserted into the second sliding hole.

21. The engine of claim 20, further comprising:

a camshaft oil hole formed in the camshaft along a length direction thereof;

a body oil hole formed in the pin body and configured to communicate with the camshaft oil hole; and an oil groove formed in the pin head and configured to communicate with the body oil hole.

\* \* \* \* \*